United States Patent Office 3,454,568
Patented July 8, 1969

3,454,568
WATER-SOLUBLE PHTHALOCYANINE DYE-STUFFS AND PROCESS FOR PREPARING THEM
Otto Fuchs, Frankfurt am Main, and Reinhold Deubel, Kelkheim, Taunus, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 293,858, July 9, 1963. This application May 13, 1966, Ser. No. 549,825
Claims priority, application Germany, July 14, 1962, F 37,311
Int. Cl. C09b 23/00, 23/16
U.S. Cl. 260—242                              15 Claims

ABSTRACT OF THE DISCLOSURE

Water-soluble and organic-soluble phthalocyanine dyestuffs of the formula

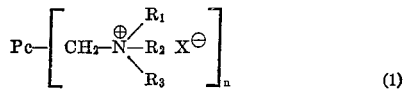

(1)

in which $R_1$ and $R_2$ represent the same or different lower alkyl or hydroxyalkyl radicals or may be members of a cyclic compound, $R_3$ represents a hydroxyalkyl radical, Pc represents a metalliferous phthalocyanine nucleus, $X^\ominus$ represents a hydroxyl ion or the anion of a carboxylic acid and $n$ stands for 2 to 4, which dyestuffs are suitable for dyeing and printing cellulose materials from aqueous media and for indelible inks of organic media for printing paper.

---

This application is a continuation-in-part of our application Ser. No. 293,858, filed July 9, 1963, now abandoned..

The present invention relates to water-soluble phthalocyanine dyestuffs and to a process for preparing them; more particularly it relates to water-soluble and in organic liquids soluble phthalocyanine dyestuffs of the formula

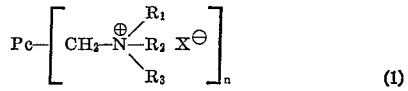

(1)

in which $R_1$ and $R_2$ represent the same or different lower alkyl or hydroxyalkyl radicals or may be members of a cyclic compound, $R_3$ represents a hydroxyalkyl radical, Pc represents a metalliferous phthalocyanine nucleus, $X^\ominus$ represents a hydroxyl ion or the anion of a carboxylic acid and $n$ stands for 2 to 4.

It has been found that water-soluble phthalocyanine dyestuffs of the formula

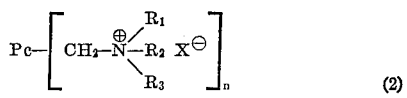

(2)

in which $R_1$ and $R_2$ represent the same or different lower alkyl or hydroxyalkyl radicals or may be members of a cyclic compound, $R_3$ represents a hydroxyalkyl radical, Pc represents a metalliferous phthalocyanine nucleus, $X^\ominus$ represents a hydroxyl ion or the anion of an inorganic or organic acid and $n$ stands for 2 to 4, can be prepared by reacting a tertiary amine of the general formula

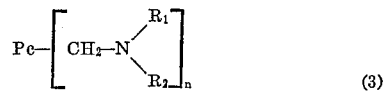

(3)

in which $R_1$, $R_2$, Pc and $n$ are defined as above, in an aqueous medium with an alkylene oxide and converting the quaternary dyestuff-ammonium hydroxide compound obtained, if desired, with an inorganic or organic acid into the quaternary dyestuff ammonium salt.

The quaternization of tertiary amines as, for example, trimethylamine with ethylene oxide is known. It was, however, surprising that the tertiary amines used as starting compounds in the process of the present invention could be quaternized with an alkylene oxide, since—as is known—quaternary ammonium hydroxides containing a benzyl group linked to the nitrogen atom are very unstable and even at room temperature soon decompose (cf. the statements in "Methoden der organischen Chemie," vol. 11/2, by Houben-Weyl).

The process is carried out advantageously by reacting the phthalocyanine derivative of the above Formula 3 in an aqueous medium with a small excess of an alkylene oxide, whereby the tertiary amine gradually dissolves. The reaction, which is finished after a few hours, is carried out at a temperature not above about 50° C., preferably at a temperature of about 20° to 30° C. A strongly alkaline solution of the quaternary dyestuff-ammonium hydroxide compound stable at room temperature is obtained.

The quaternary dyestuff-ammonium hydroxide compound can be obtained in solid state by adding a precipitant miscible with water, such as acetone, to the reaction mixture. From the quaternary dyestuff-ammonium hydroxide compounds the corresponding water-soluble ammonium salt compounds can be prepared by neutralizing with any inorganic or organic acid. As acids there may be used, for example, hydrochloric acid, sulfuric acid, phosphoric acid, formic acid, acetic acid, propionic acid, butyric acid, valeric acid, benzoic acid, p-toluene sulfonic acid, mono-chloro acetic acid, tartaric acid and sorbic acid. The aliphatic carboxylic acids preferably contain 1 to 6 carbon atoms.

According to another embodiment of the process of the present invention the quaternary ammonium salt compounds can directly be obtained by introducing the alkylene oxide and the desired acid simultaneously into a suspension of the tertiary amine in water, the pH value of the reaction mixture being kept between about 7 and 8 by adjusting the introduction rate of the acid, or by converting the tertiary amine with the calculated amount of acid into the salt and then reacting the salt with an alkylene oxide. According to this embodiment the reaction can be carried out at temperatures between about 0° and 100° C., preferably between about 20° and 50° C. The optimum temperature to be used in each individual case has to be adjusted to the reaction components used.

As starting compounds there may be used in the process of the present invention metalliferous phthalocyanine compounds containing 1 to 6 preferably 2 to 4, tertiary amino groups linked via methylene group to the benzene nucleus of the molecule. As exemples are mentioned:

tri(ω-N-dimethylaminomethyl),
tetra(ω-N-morpholinyl-methyl),
tetra(ω-N-pyrrolidylmethyl),
di(ω-N-diethylaminomethyl) and
di(ω-N-methyl-N-hydroxyethylaminomethyl)copper-phthalocyanine,
di(ω-N-dimethylaminomethyl)-nickel-phthalocyanine and
tri(ω-N-dimethylaminoethyl)-cobalt-phthalocyanine.

The starting compounds used in the process of the present invention can be prepared by reacting a metalliferous phthalocyanine containing chloro- or bromoethyl groups with a secondary amine such as dimethylamine, diethylamine, dibutylamine, methylhydroxyethylamine, morpholine, pyrrolidine or piperidine.

In contrast to processes known from U.S. Patent 2,464,806 and British Patent 770,784 which are limited to the preparation of quaternary ammonium groups containing phthalocyanine dyestuffs with specific anions (halogen, sulfate and sulfonate anions), the claimed process enables the preparations of quaternary phthalocyanine dyestuffs containing any desired anion. This great technical advantage over the prior art is due to the fact that in the claimed reaction of phthalocyanine derivatives containing a tertiary amino group with alkyleneoxides, quaternary dyestuff ammonium hydroxide compounds are obtained surprisingly which may be recovered as such or can be converted at any stage of the process by treating with any desired inorganic or organic acid into the corresponding salts.

The compounds of the above Formula 2 obtainable by the process of the present invention are very suitable for dyeing and printing cellulose materials. The water-soluble dyestuffs can be fixed fast on fibers of natural or regenerated cellulose with agents having an alkaline reaction. The brilliant turquois dyeings and prints obtained are distinguished by very good fastness properties, particularly by a very good fastness to wet processing and to light.

The novel dyestuffs of the above Formula 1 which are by no means preparable according to the methods hitherto known are well soluble in water as well as in many organic solvents such as glycols, for example ethylene or propylene glycol, diethylene glycol, dipropylene glycol, methanol, ethanol and benzyl alcohol. Owing to this property said dyestuffs are not only suitable for dyeing and printing cellulose materials from aqueous media, but they may also be used for the preparation of highly concentrated dyestuff solutions. Such solutions can be employed for the printing of paper as indelible inks or for the preparation of ball point inks. Especially, the dyestuffs are suitable for the preparation of dyestuff solutions on glycol basis which could not be prepared from the known quaternary ammonium dyestuffs which are scarcely soluble in glycols and in other organic solvents. The prints on paper obtained with said dyestuff solutions possess a high fastness to light and to water.

The following examples serve to illustrate the invention, but they are not intended to limit it thereto, the parts being by weight unless otherwise stated and the relationship of parts by weight to parts by volume being the same as that of the kilogram to the liter.

EXAMPLE 1

25 parts of tri(ω-N-dimethylaminomethyl)-copper-phthalocyanine are introduced slowly, while stirring, at room temperature into a solution of 10 parts of ethylene oxide in 50 parts of water, whereby the tertiary amine slowly dissolves. After having continued stirring for 3 hours, the ethylene oxide in excess is distilled off in vacuo. A viscous blue 40% solution of the dyestuff is thus obtained which can directly be used as printing or dyeing paste. A blue dyestuff powder which is easily soluble in water is obtained by mixing the dyestuff solution obtained with acetone, suction-filtering the precipitated blue dyestuff and drying it cautiously after washing.

The dyestuff can be fixed fast on cotton or staple fiber with agents having an alkaline reaction. Brilliant turquoise blue dyeings and prints are thus obtained possessing a good fastness to washing and to light.

When using instead of 25 parts of tri(ω-N-dimethylaminomethyl)-copper-phthalocyanine an equivalent amount of di(ω-N-dimethylaminomethyl)-nickel-phthalocyanine, a water-soluble greenish blue dyestuff is obtained which on cellulose materials yields dyeings and prints possessing similarly good fastness properties.

When the dyestuff hydroxides so obtained are treated with formic acid, acetic acid, propionic acid, butyric acid or mono-chloro acetic acid, the corresponding salts are obtained. Said salts are well soluble in ethylene glycol, propylene glycol, diethylene glycol, dipropylene glycol, methanol, ethanol and benzyl alcohol.

EXAMPLE 2

10 parts of propylene oxide are added dropwise, at room temperature, to a suspension of 25 parts of tri (ω-N-dimethylaminomethyl)-copper-phthalocyanine in 100 parts of water. The mixture is after-stirred until the tertiary amine is entirely dissolved and then neutralized with dilute acetic acid. The water-soluble acetate can be isolated by precipitating it with acetone, or the propylene oxide and the water are distilled off in vacuo. The dyestuff yields on cotton brilliant turquoise dyeings possessing a good fastness to wet processing and to light.

When replacing the tri(ω-N-dimethylaminomethyl)-copper-phthalocyanine by an equivalent amount of tri(ω-N-dimethylaminomethyl)cobalt-phthalocyanine, a reddish blue dyestuff is obtained which on cellulose materials yields dyeings and prints possessing good fastness properties.

EXAMPLE 3

9.3 parts of the tertiary amine obtained by reacting a mixture of tri- and tetra(chloromethyl)-copper-phthalocyanine with morpholine are introduced into a solution of 3 parts of ethylene oxide in 100 parts of water. At room temperature the reaction is finished after about 50 hours. The ethylene oxide in excess is distilled off in vacuo and the aqueous solution thus obtained is directly printed or padded on fibrous material. After developing with alkali, clear turquoise dyeings and prints are obtained possessing good fastness properties.

EXAMPLE 4

30 parts of the tertiary amine obtained by reacting tetra(chloromethyl)-copper-phthalocyanine with pyrrolidine are stirred for 24 hours at room temperature with 80 parts of water and 10 parts of ethylene oxide. Subsequently the ethylene oxide in excess is distilled off in vacuo. An about 30% aqueous dyestuff solution is obtained which may be used directly for dyeing and printing cotton.

EXAMPLE 5

15 parts of tri(ω-N-diethylaminomethyl)-copper-phthalocyanine are introduced, while stirring, into 100 parts of water and 5 parts of glacial acetic acid are added. 9 parts or ethylene oxide are then added and the whole is heated for 6 hours at 80° to 100° C. in an autoclave. After distilling off in vacuo the ethylene oxide in excess, the blue dyestuff may be precipitated from the aqueous dyestuff solution by adding acetone and isolated by filtering with suction. The solution may also be concentrated to the desired percentage by distilling off the water in vacuo.

The dyestuff obtained yields on natural and regenerated cellulose materials brilliant fast turquoise dyeings and prints.

EXAMPLE 6

30 parts of a 20% aqueous ethylene oxide solution are added dropwise to a suspension of 15 parts of tri(ω-N-dimethylaminomethyl)-copper-phthalocyanine in 150 parts of water, the pH-value being kept during the reaction at 7.5 to 8 by slowly adding a phosphoric acid of 10% strength. The quaternization is complete when no more phosphoric acid is taken up. Phosphoric acid is added until the dyestuff solution shows a weakly acid reaction, the ethylene oxide in excess is distilled off in vacuo and the solution is concentrated to the percentage desired, or the blue quaternary dyestuff salt is prepicitated with acetone. The dyestuff thus obtained can be dyed on cotton and fixed fast by adding dilute alkalis.

When in the above example phosphoric acid is replaced by solutions of 10% strength of formic acid, acetic acid, propionic acid, butyric acid, valeric acid, sorbic acid or benzoic acid, the corresponding salts are obtained. Said salts are well soluble in ethylene glycol, propylene glycol, diethylene glycol, dipropylene glycol, methanol, ethanol and benzyl alcohol. The solutions obtained can be used as printing inks and indelible inks. The prints obtained with such solutions possess a high fastness to light and water.

EXAMPLE 7

When replacing the tri(ω-N-dimethylaminomethyl-copper-phthalocyanine described in Example 6 by an equivalent amount of di(ω-N-methyl-N-hydroxyethylaminomethyl)-copper-phthalocyanine and neutralizing the reaction mixture with acetic acid instead of phosphoric acid, the acetate of a quaternary copper-phthalocyanine dyestuff which is easily soluble in water is obtained. Under the dyeing conditions described in Example 1 the dyestuff salt yields on cellulose materials turquoise blue dyeings and prints possessing good fastness properties.

We claim:

1. A compound of the formula

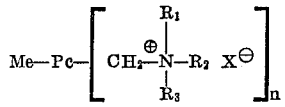

wherein $R_1$ and $R_2$ are lower alkyl, hydroxyl lower alkyl, and taken together, lower alkylene or lower alkylene ether, $R_3$ is a hydroxy lower alkyl, Pc is phthalocyanine, Me is copper, nickel or cobalt, $X^\ominus$ is a hydroxyl ion or the anion of an aliphatic carboxylic acid and $n$ stands for 2 to 4.

2. The compound of the formula

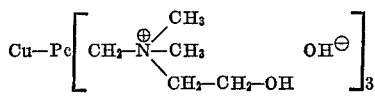

wherein Pc is phthalocyanine.

3. The compound of the formula

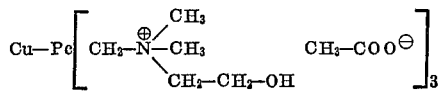

wherein Pc is phthalocyanine.

4. The compound of the formula

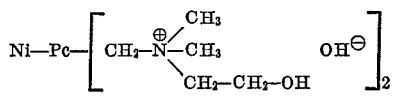

wherein Pc is phthalocyanine.

5. The compound of the formula

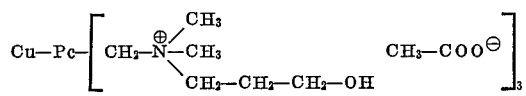

wherein Pc is phthalocyanine.

6. The compound of the formula

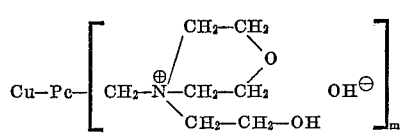

wherein Pc is phthalocyanine and $m$ has a numerical value between 3 and 4.

7. A process for preparing water-soluble phthalocyanine dyestuffs of the formula

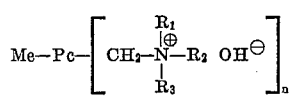

wherein $R_1$ and $R_2$ are lower alkyl, hydroxy lower alkyl, and taken toegther, lower alkylene or lower alkylene ether, $R_3$ is a hydroxy lower alkyl, Pc is phthalocyanine, Me is copper, nickel or cobalt, and $n$ stands for 2 to 4 which comprises reacting a tertiary amine of the formula

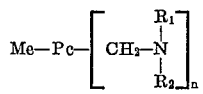

wherein Me, Pc, $R_1$, $R_2$ and $n$ are as defined above, in an aqueous medium with a lower alkylene oxide.

8. A process as defined in claim 7, which further comprises reacting the dyestuff prepared therein with an inorganic acid or an organic acid to prepare a dyestuff of the formula

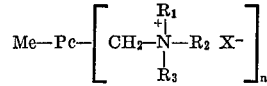

wherein X is the anion of said inorganic or organic acid.

9. A process as defined in claim 7, wherein said tertiary amine and said lower alkylene oxide are reacted at a temperature below 50° C.

10. A process as defined in claim 7, wherein said tertiary amine and said lower alkylene oxide are reacted at a temperature in the range of 20° to 30° C.

11. A process for preparing water-soluble phthalocyanine dyestuffs of the formula

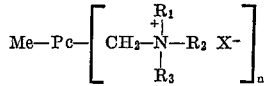

wherein $R_1$ and $R_2$ are lower alkyl, hydroxy lower alkyl, and taken together, lower alkylene or lower alkylene ether, $R_3$ is a hydroxy lower alkyl, Pc is phthalocyanine, Me is copper, nickel or cobalt, $X^-$ is the anion of an inorganic acid or an organic acid, and $n$ stands for 2 to 4, which comprises reacting a tertiary amine of the formula

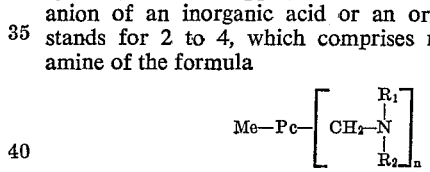

wherein Me, Pc, $R_1$, $R_2$ and $n$ are as defined above, in an aqueous medium with a lower alkylene oxide to prepare a quaternary ammonium hydroxide intermediate compound, and reacting said intermediate compound with an inorganic acid or an organic acid.

12. A process as defined in claim 11, further comprising adding said lower alkylene oxide and said acid simultaneously to a suspension of said tertiary amine in water, and maintaining the pH of the reaction mixture in the range between 7 and 8 by controlling the rate of addition of said acid.

13. A process for preparing water-soluble phthalocyanine dyestuffs of the formula

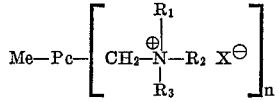

wherein $R_1$ and $R_2$ are lower alkyl, hydroxy lower alkyl, and taken together, lower alkylene or lower alkylene ether, $R_3$ is a hydroxy lower alkyl, Pc is phthalocyanine, Me is copper, nickel or cobalt, $X^\ominus$ is the anion of an inorganic acid or an organic acid, and $n$ stands for 2 to 4, which comprises reacting a tertiary amine of the formula

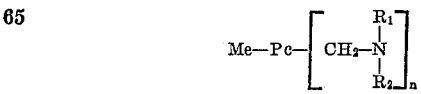

wherein Me, Pc, $R_1$, $R_2$ and $n$ are as defined above, in an aqueous medium with an inorganic acid or an organic acid to form a salt of said tertiary amine, and reacting said salt with a lower alkylene oxide.

14. A process as defined in claim 13, wherein the reaction is carried out at a temperature in the range of 0° to 100° C.

15. A process as defined in claim 13, wherein the reaction is carried out at a temperature in the range of 20° to 50° C.

References Cited

UNITED STATES PATENTS

| | | |
|---|---|---|
| 2,464,806 | 3/1949 | Haddock et al. |
| 3,009,920 | 11/1961 | Jaeger et al. |

FOREIGN PATENTS

| | | |
|---|---|---|
| 700,784 | 3/1957 | Great Britain. |
| 844,338 | 8/1960 | Great Britain. |

OTHER REFERENCES

Phillips: Peracetic Acid and Derivatives, Union Carbide Chem. Co. (1957), p. 20.

Concent: Chemistry of Organic Compounds, Macmillian (1939), pp. 162–3.

HENRY R. JILES, *Primary Examiner.*

R. T. BOND, *Assistant Examiner.*

U.S. Cl. X.R.

8—7, 54.2; 260—314.5